United States Patent [19]

Tattermusch et al.

[11] Patent Number: 4,930,804
[45] Date of Patent: Jun. 5, 1990

[54] INDEPENDENT WHEEL SUSPENSION FOR MOTOR VEHICLES

[75] Inventors: Peter Tattermusch, Esslingen; Günter Bartel, Stuttgart, both of Fed. Rep. of Germany

[73] Assignee: Daimler-Benz AG, Stuttgart, Fed. Rep. of Germany

[21] Appl. No.: 271,865

[22] Filed: Nov. 16, 1988

[30] Foreign Application Priority Data

Nov. 17, 1987 [DE] Fed. Rep. of Germany ....... 3738964

[51] Int. Cl.$^5$ ............................................... B60G 3/00
[52] U.S. Cl. ..................................... 280/690; 280/675
[58] Field of Search ............... 280/661, 688, 668, 673, 280/690, 701, 675

[56] References Cited

U.S. PATENT DOCUMENTS

| | | | |
|---|---|---|---|
| 4,444,415 | 4/1984 | Ohe ..................................... | 280/690 |
| 4,681,342 | 7/1987 | Goerich .............................. | 280/690 |
| 4,790,560 | 12/1988 | Asanuma et al. .................... | 280/696 |

Primary Examiner—Richard A. Bertsch
Attorney, Agent, or Firm—Evenson, Wands, Edwards, Lonahan & McKeown

[57] ABSTRACT

The invention relates to an independent wheel suspension for power driven rear wheel motor vehicles, having a wheel carrier and a lower and upper linkage for this wheel carrier. The suspension system has five individual links which are hinged at the wheel side to the wheel carrier and at the body side of the vehicle, with an upper linkage being formed by a rear transverse camber strut link, and a longitudinal tension strut link extending diagonally toward the front inside. The camber strut and the tension strut, as viewed in plan, having an imaginary intersecting point located between their ends and wherein, with respect to the longitudinal direction of the vehicle, the linking point of the camber strut at the wheel carrier is located in front of the linking point of the tension strut and wherein a reversed arrangement exists on the body side.

14 Claims, 3 Drawing Sheets

INDEPENDENT WHEEL SUSPENSION FOR MOTOR VEHICLES

BACKGROUND AND SUMMARY OF THE INVENTION

The invention relates to an independent wheel suspension for powered rear axles of motor vehicles, having a wheel carrier with an upper and lower linkage formed by individual links wherein, with respect to the forward driving direction of the vehicle, the lower linkage has a rear transverse link, as the spring link carrying the spring damper and/or the shock absorber, and a front longitudinal link extending diagonally toward the front inside, as the compression strut; and the upper linkage is formed by a rear transverse link, as the camber strut, and a longitudinal link extending toward the front, as the tension strut. The linking points of these struts to the wheel carrier are offset and toward the inside, with respect to the longitudinal plane of the wheel center. A tie rod is provided which extends in transverse direction of the vehicle and is offset with respect to the transverse plane of the wheel center.

Wheel suspensions of the above-described type are known from German Patent No. DE-PS 30 48 794. They have also proven themselves in practice and distinguish themselves in that, while having a small overall size, they ensure an extremely precise wheel guidance and, at the same time, a good comfort behavior of the axle.

The invention is based on the object of developing such wheel suspensions without any loss of comfort with respect to high axle stiffness with a small overall size, as required particularly for use in heavy passenger cars.

In the case of the wheel suspension of the initially mentioned type, this is achieved in that the tension strut and the camber strut of the upper linkage cross one another in the wheel side area in such a manner that the linking point of the camber strut at the wheel carrier is located in front of the corresponding linking point of the tension strut on the wheel side, and both linking points are located on different sides of the transverse plane of the wheel center. Also in plan view, the camber strut and the spring link as well as the tension strut and the compression strut extend approximately in parallel. The angle between the tension strut and the camber strut of the upper linkage is open toward the vehicle center, in plan view, and is located inside the angle between the compression strut and the spring link of the lower linkage.

By the crossed arrangement of the two struts of the upper linkage, a stiffening of the whole linkage system is obtained. Thus, not only the upper linkage is stiffened, but the crossing of these struts also has the result that the struts of the lower linkage, with respect to the upper linkage, with their linking points on the wheel carrier side, are disposed in a crossed position with respect to the transverse plane of the wheel center. This, while the construction is narrow, it still results in high stability with respect to the alignment of the wheel carrier because swivel movements of the wheel carrier are counteracted by the crossed arrangement of the struts and the crossed bearings of the linking points on the wheel carrier side and by corresponding bracings. The increased axle stiffness has an advantageous effect with respect to a precise wheel guidance during starting and braking. In addition, lateral forces can also be absorbed well. All these effects are achieved without any additional space requirements, and with respect to the same axle stiffnesses, a wheel suspension constructed according to the invention may be even narrower than previously known systems.

The crossed struts forming the upper linkage, in the crossing area, may be guided freely past one another, or one of the struts, if the other strut has a corresponding recess, may be guided through the other strut. Finally, it is even possible to connect the struts elastically in the crossing area, thus, for example, by a rubber link joint of the like, whereby the stiffness of the linkage system can be further improved.

Wheel suspensions having crossed struts are known (Japanese Patent No. 59/223507). In this known wheel suspension, the steered front wheels of a motor vehicle have an upper and a lower linkage for a wheel carrier. One of the linkages is formed by a wishbone, while the other linkage consists of two crossed struts. Since it is known that, in the case of linkages constructed of individual links, the respective imaginary intersecting point of the struts forms an imaginary linking point, in this known construction, the steering axle, with respect to its position, on the one side, is determined by the imaginary point of intersection and, on the other side, by the linking point of the wishbone. By using crossed struts for a linkage, particularly for the upper linkage, certain constructive liberties are therefore obtained with respect to the position of the steering axle which is significant for front wheel suspensions, but plays no particular role in the case of rear wheel suspensions. The known construction has no significant influence on the stability because the second linkage is formed only by a wishbone having a linking point on the wheel carrier side.

Other objects, advantages and novel features of the present invention will become apparent from the following detailed description of the invention when considered in conjunction with the accompanying drawings.

DETAILED DESCRIPTION OF THE DRAWINGS

The figures show a wheel suspension of a motor vehicle. Since this suspension is constructed as an independent wheel suspension, a symmetrical construction exists for the right and the left vehicle side, and the representation is therefore limited to only one vehicle side.

Specifically, the shown wheel suspension is for a passenger car, and more specifically for its powered rear axle.

Figure 1:
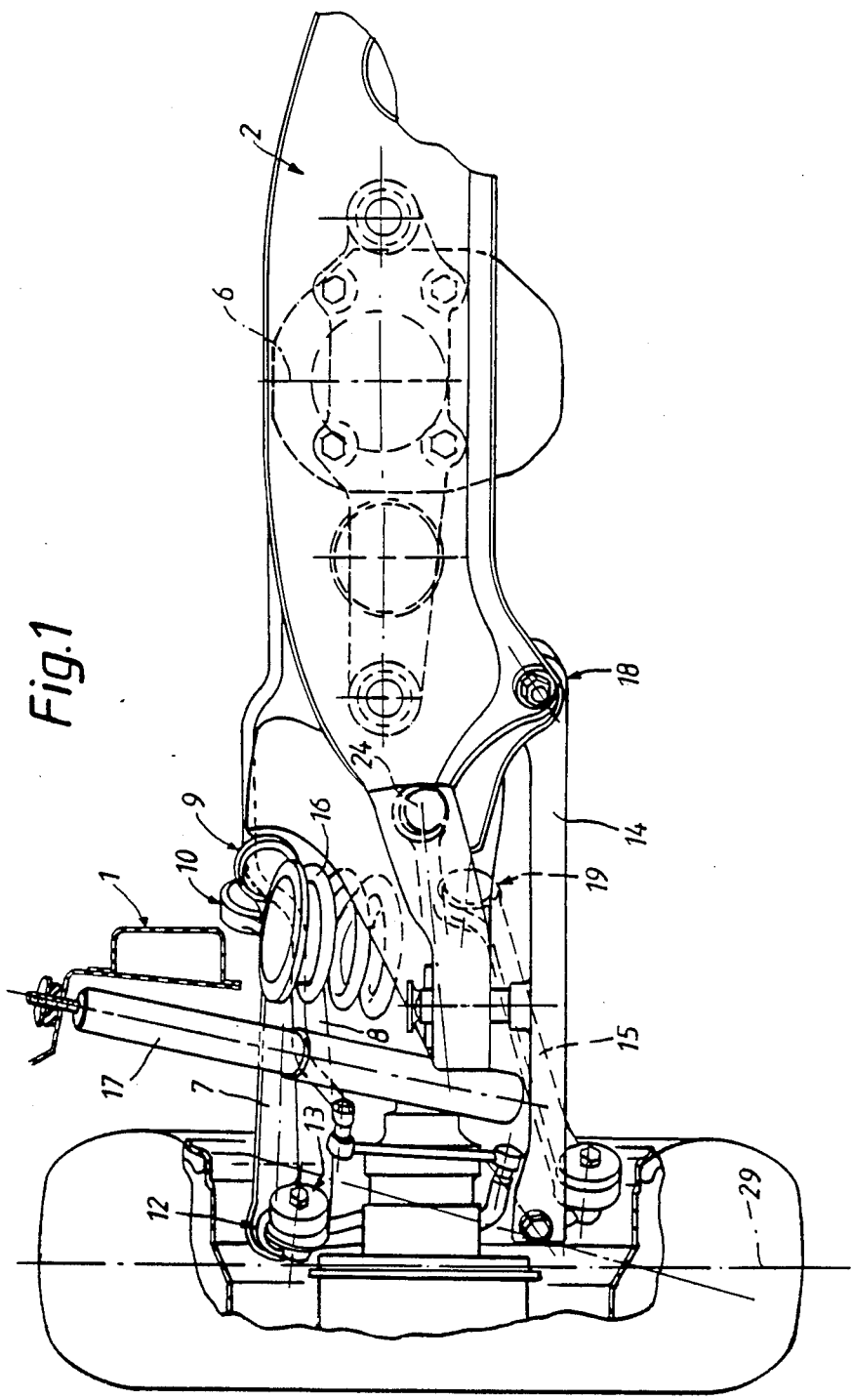
FIG. 1 is a simplified representation of a rear view of the wheel suspension according to the invention.
Figure 3:
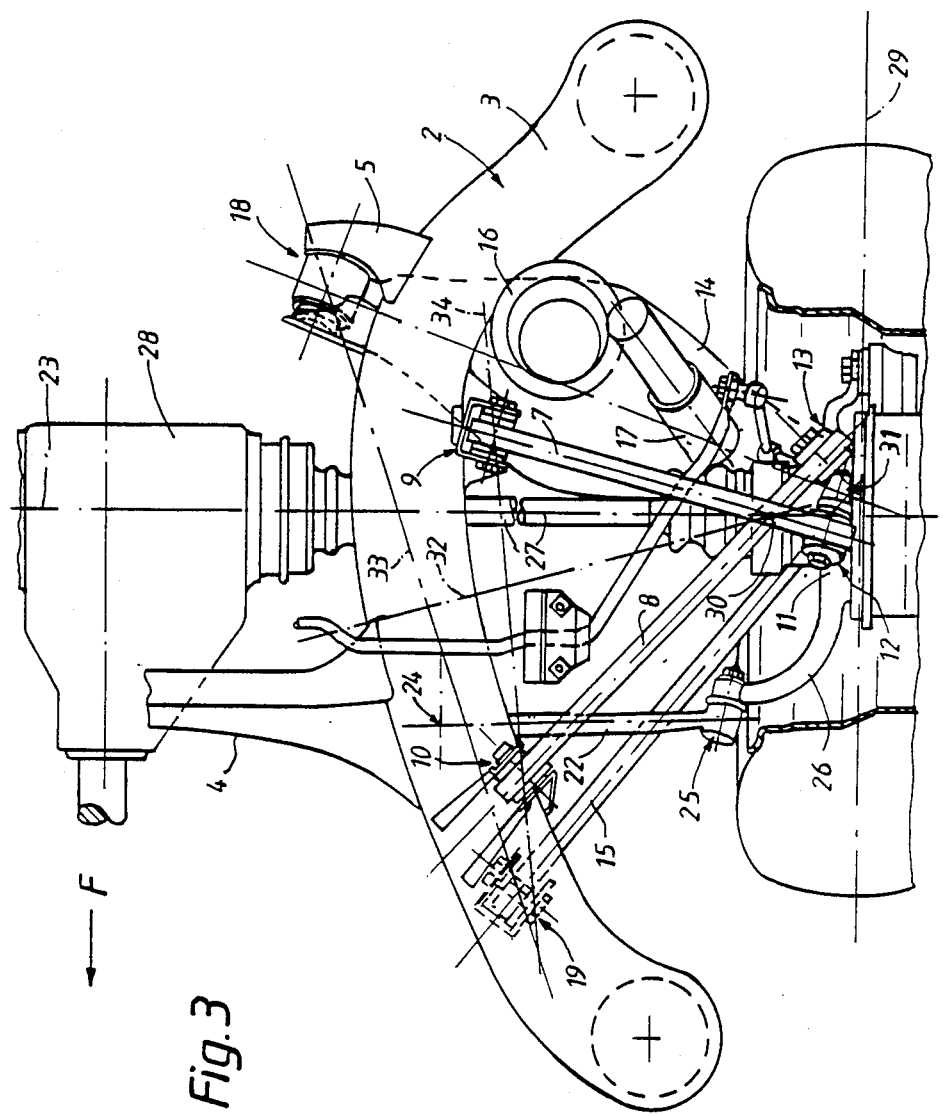
FIG. 3 is a plan view of the wheel suspension according to FIGS. 1 and 2.

Referring to FIG. 1, the connection of the axle with the vehicle body 1 takes place by an intermediate frame 2 and which has lateral side members 3 which are connected by cross members 4 and 5 (FIG. 3).

The intermediate frame 2 is not the subject of the invention and is of interest only to the extent that the fastening of the upper and the lower linkage of the wheel suspension takes place at its side members 3, of which, because of the symmetrical construction with respect to the longitudinal center plane of the vehicle 6, only one is shown.

The upper linkage is formed by both a transverse link 7, which is in the rear relative to the driving direction F and serves as the camber strut, as well as a front longitudinal link 8 that serves as the tension strut. On the body side, both the camber strut 7 and the tension strut 8 are hinged to the side member 3 to linking points 9 and 10. The fastening takes place by the conventional bearing connections. On the wheel side, the camber strut 7 and the tension strut are also hinged to the wheel carrier 11 to linking points 12 and 13.

The lower linkage consists of both a rear transverse link 14, which carries the spring 16 and the shock absorber 17 and is called a spring link, and of a front longitudinal link 15 which will be called a compression strut.

The linking points on the body side of the spring link 14 and the compression strut 15 have the reference numbers 18 and 19. On the wheel side, the corresponding linking points at the wheel carrier 11 have reference number 20 and 21. They are shown particularly in FIG. 2.

Next to the upper and the lower linkage, a tie rod 22 is provided, which, in driving direction F, is located in front of the transverse plane 23 of the wheel center and, in plan view, extends approximately in parallel to it. Its linking point on the body side has the reference number 24, and its linking point on the wheel carrier side has the reference number 25. The linking point 25 is located at the end of an arm 26 of the wheel carrier projecting toward the front.

In the wheel carrier 11, the respective drive shaft 27 is also disposed, which is connected to the axle transmission 28 which itself is also held at the intermediate frame 2 in a manner that is not described in detail.

Specifically, the camber strut 7, starting from the wheel carrier, in plan view, extends slightly diagonally toward the rear and more specifically approximately at an angle of 15° with respect to the transverse plane 23 of the wheel center. The tension strut 8, starting from the wheel carrier 11, extends diagonally toward the front and inside, being aligned at an angle of approximately 40° with respect to the longitudinal plane 29 of the wheel center. In plan view, the camber strut 7 and the tension strut 8 have a crossing point 30.

The tension strut 8, as shown in FIG. 1 is guided through under the camber strut 7, and, for this purpose, is slightly arched downward over its length. Since the camber strut 7 as well as the tension strut 8 are extended beyond the crossing point, and thus the crossing point 30 represents an imaginary intersecting point which is formed by the extension of the struts, longer strut lengths are obtained with respect to such known embodiments. These longer strut lengths, in combination with the shown crossed arrangement, result in a special stiffening, specifically with respect to lateral forces as well as to longitudinal forces.

This becomes particularly clear in connection with the construction of the lower linkage, which is formed by the spring links 14 and the compression strut 15, in which case, the linking point, on the wheel carrier side, of the spring strut 14 serving as the rear link, in plan view, is located essentially below the linking point 13, on the wheel carrier side, of the tension strut 8, which, with respect to the upper linkage, forms the front link. Similarly, the linking point 12, on the wheel carrier side, of the camber strut 7 and the linking point 21, on the wheel carrier side, of the compression strut 15 are located above one another in plan view. This crosswise support, not only with respect to the two struts 7 and 8 of the upper linkage, but also with respect to the linking points 12, 13, 20 21, on the wheel carrier side, contributes significantly to the required stiffening of the axle linking system.

The spring link 14, starting from the wheel, extends diagonally toward the rear and inside, specifically sloped essentially at an angle of approximately 20° with respect to the transverse plane 23 of the wheel center. The compression strut 15, starting from the wheel, extends diagonally toward the front and inside, specifically at an angle of approximately 40° with respect to the longitudinal plane 29 of the wheel center.

The links of the upper linkage, specifically the camber strut 7 and the tension strut 8 as well as the links of the lower linkage, specifically the spring link 14 and the compression strut 15, in plan view, form the sides of an angle opening up toward the center of the vehicle. The verteces of these angles, for the upper linkage, are formed by the imaginary crossing point 30 in the plan view according to FIG. 3, and for the lower linkage, by the intersecting point 31 of the axes of the spring link 14 and the compression strut 15. The bisecting lines of both angles are located essentially in a plane which in the plan view has the reference number 32 and is located at an angle of approximately 15° with respect to the transverse plane 23 of the wheel center, in which case the plane 32 extends diagonally toward the front and inside.

Figure 2:
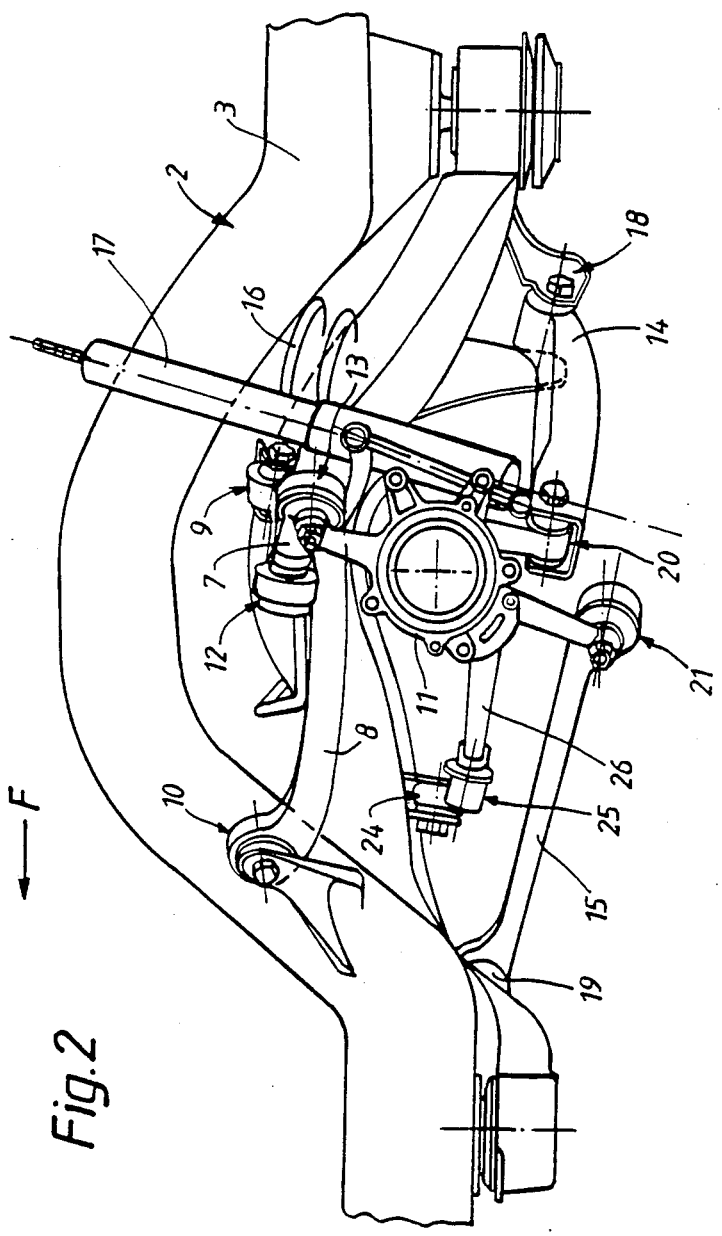
FIG. 2 is a lateral view of this wheel suspension, shown without the wheel shown in FIG. 1.

Since, as shown in FIGS. 1 and 2, the camber strut 7, the tension strut 8 and the spring link 14 extend essentially horizontally, and since the compression strut 15 is only slightly sloped toward the front and upward, on the whole, the course of the tension strut 8 and of the compression strut 15 as well as of the camber strut and of the spring link 14 may be considered to be approximately parallel. In combination with the crossing of the camber strut 7 and of the tension strut 8, a very stiff linkage connection is thus obtained, in which case the imaginary upper linking point created by the crossing and the imaginary intersecting point 31 of the lower linkage determine the swivel axis, with respect to which the wheel carrier 11 is supported by the tie rod 22.

In this case, the tie rod extends essentially horizontally and in transverse direction of the vehicle. the linking points 24 and 25 of the tie rod, in plan view. being disposed at opposite sides of the tension strut 8 and the compression strut 15. The linking point 24, on the body side, of the tie rod 22 is also located almost on the swivel axis of the lower linkage which is determined by the connecting line 33 extending through the linking points 18, 19 on the body side of the spring link 14, on the one side, and of the compression strut 15, on the other side.

The linking points 9 and 10, on the body side, of the camber strut 7 and of the tension strut 8 determine the swivel axis 34 of the upper linkage. The connecting line or swivel axis 33 and the swivel axis 34 are located at an angle with respect to one another. With respect to one another, they enclose an angle of approximately 15°, which opens up against the driving direction.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed:

1. An independent wheel suspension for powered rear axles of motor vehicles, having a wheel carrier and having an upper and lower linkage for this wheel carrier formed by individual links, in which, with respect to the forward driving direction, the lower linkage has a rear transverse link, as the spring link carrying the spring damper and/or the shock absorber, and a front longitudinal link extending diagonally toward the front inside, as the compression strut, the upper linkage is formed by means of a rear transverse link, as the chamber strut, and a longitudinal link extending toward the front, as the tension strut, and the linking points of these struts, on the wheel side, with respect to the longitudinal plane of the wheel center, are offset toward the inside, and in which a tie rod is provided which extends in transverse direction of the vehicle and is offset with respect to the transverse plane of the wheel center, characterized in that the tension strut 8 and the chamber strut 7 of the upper linkage cross one another in the wheel side area such that the linking point 12 of the camber strut 7 at the wheel carrier 11 is located in front of the corresponding wheel side linking point 13 of the tension strut 8, and both linking points 12, 13 are located on different sides of the transverse plane 23 of the wheel center, and wherein when viewed in plan, the camber strut and the spring link extend approximately in parallel to each other and the tension strut and the compression strut extend approximately in parallel with each other, the angle, which is enclosed by the tension strut 8 and the camber strut 7 of the upper linkage and is open toward the vehicle center, when viewed in plan is located inside the angle enclosed by the compression strut 15 and the spring 14 of the lower linkage.

2. A wheel suspension according to claim 1, wherein the camber strut of the upper linkage extends with respect to a transverse plane of the venicle at an angle of approximately 15° diagonally toward the rear inside.

3. A wheel suspension according to claim 1, wherein the tension strut of the upper linkage extends with respect to a longitudinal plane of the vehicle at an angle of approximately 45° diagonally toward the inside front.

4. A wheel suspension according to claim 1, wherein the camber strut of the upper linkage extends essentially at the same angle diagonally toward the rear inside of the vehicle as the spring link of the lower linkage.

5. A wheel suspension according to claim 1, wherein the tension strut of the upper linkage extends essentially at the same angle diagonally toward the front inside of the vehicle as the compression strut of the lower linkage.

6. A wheel suspension according to claim 1, wherein bisecting lines of the angle between the tension strut and the camber strut of the upper linkage and the compression strut and the spring link of the lower linkage are located approximately in the same vertical plane.

7. A wheel suspension according to claim 6, wherein the vertical plane containing the bisecting lines of the angles of the upper and the lower linkage extends, with respect to the transverse plane of the vehicle, at an angle of approximately 15° diagonally toward the front inside.

8. A wheel suspension according to claim 1, wherein the tie rod extends in a transverse plane of the vehicle, and with respect to the transverse plane of the wheel center, is displaced toward the front of the vehicle and adjacent to a further linking point connecting the tension strut to the body of the vehicle.

9. A wheel suspension according to claim 1, wherein when view in plan view, the tie rod crosses the tension strut and the compression strut, and wherein tie rod linking points connecting the tie rod to the vehicle body and the wheel carrier are located on different sides of the tension strut and of the compression strut.

10. A wheel suspension according to claim 1, wherein swivel axes creating additional linking points connecting the upper linkage to the vehicle body, and additional linking points connecting the lower linkage, to the vehicle body, extend at an angle of approximately 15° with respect to one another which angle opens up toward the rear against the driving direction of the vehicle of the vehicle.

11. A wheel suspension according to claim 10, wherein an intersecting point of both swivel axes in plan view, is located in front of the additional linking point connecting the upper and the lower linkage to the vehicle body which is in front in the driving direction.

12. A wheel suspension according to claim 10, wherein a side of the angle which is formed by the swivel axis of the upper linkage is located closer to the wheel than a side of the angle formed by the swivel axis of the lower linkage.

13. A wheel suspension according to claim 10. wherein a linking point connecting tie rod to the vehicle body as seen in plan view, is located in the area of the swivel axis of the lower linkage.

14. A wheel suspension according to claim 10. wherein a linking point connecting the tie rod to the vehicle body as seen in plan view, is offset with respect to the swivel axis of the lower linkage with regard to a longitudinal center plane of the vehicle.

* * * * *